Dec. 22, 1959 W. W. LUDMAN ET AL 2,918,648
TESTING APPARATUS
Filed June 15, 1956 4 Sheets-Sheet 1

INVENTORS
WALTER W. LUDMAN
THEODORE SOWIRKA
BY
Carl H. Synnestvedt
AGENT

Dec. 22, 1959 W. W. LUDMAN ET AL 2,918,648
TESTING APPARATUS
Filed June 15, 1956 4 Sheets-Sheet 2

INVENTORS
WALTER W. LUDMAN
THEODORE SOWIRKA
BY
Carl H. Synnestvedt
AGENT

Dec. 22, 1959     W. W. LUDMAN ET AL     2,918,648
TESTING APPARATUS

Filed June 15, 1956     4 Sheets-Sheet 3

INVENTORS
WALTER W. LUDMAN
THEODORE SOWIRKA
BY
Carl H. Synnestvedt
AGENT

Dec. 22, 1959   W. W. LUDMAN ET AL   2,918,648
TESTING APPARATUS
Filed June 15, 1956   4 Sheets-Sheet 4

INVENTORS
WALTER W. LUDMAN
THEODORE SOWIRKA
BY
Carl H. Synnestvedt
AGENT

United States Patent Office 2,918,648
Patented Dec. 22, 1959

2,918,648

TESTING APPARATUS

Walter W. Ludman and Theodore Sowirka, Philadelphia, Pa., assignors to Philco Corporation, Philadelphia, Pa., a corporation of Pennsylvania Application June 15, 1956, Serial No. 591,740

7 Claims. (Cl. 339—150)

The mechanism to be described herein has been developed for the testing of electrical circuit systems. It has to do particularly with the testing of so-called printed circuit panels, used in radio and television receivers and the like.

Testing circuits are now available which can easily give test impulses at such rates as several millions per day, but the mass of the panels to be tested, as well as the bulk of contactors and attached wires could not so far be manipulated with commensurate speed, particularly if arrangements were such as to allow testing of any selected panel elements, not only of some tube terminals, in order to avoid or minimize obscuring of test results.

It is an object hereof to provide improved mechanical testing means adapted to the expanded possibilities of electrical testing systems.

It is a further object to facilitate the movements, mutual contacting and other manipulations of panels, wires and other units involved in the testing of circuit systems, particularly, to make the manipulations as simple as possible; to arrange them so that all operations auxiliary to the passage of the actual testing currents can be performed on each panel or system by means of a minimum number of operations, either automatic or manual; to provide a maximum of safety for personnel and equipment; and to insure great rapidity of the mechanical work, even if the speed of the purely electrical work cannot, in many operations, be entirely matched by the mechanism.

It is a further, particular object to make sure that each pair of mutually contacting members, in the testing of each panel, should be registered relative to one another with sufficient accuracy and should then be exposed, momentarily, to a high degree of mechanical pressure, in order to insure a direct-coupled, low-resistance metal-to-metal relationship, for instance between a solder spot on the underside of a panel and a contact point on a testing pin or contactor. In this connection it is also necessary to offset factors such as the deposition of electrically insulating dirt particles on metallic contact surfaces, the lack of dimensional stability of the circuit panels, and their tendency to warp.

Briefly described, a preferred embodiment of the invention comprises a set of combined, suitably registered, resiliently mounted contacting members, upwardly projecting from a box-like under-structure which contains lead wires secured to said members. There is provided an overlying set of rigid, distributed back-up fingers; and these several parts are so combined, by a relatively simple mechanism, that the contact pressure, momentarily maintained on the panel by each contacting member, can be and is of a high order of magnitude and accompanied or preceded by suitable wiping actions to insure metal-to-metal contact. The arrangement is such that all manipulations auxiliary to an electrical testing cycle can be performed within seconds or split seconds.

These and other features, advantages and objects of the invention will be understood most readily upon a study of the detailed description which follows, in connection with the drawing appended hereto.

In the drawing, Figure 1 is a perspective view of a panel testing device constructed in accordance with this invention, the device being shown in open position.

Figure 4:
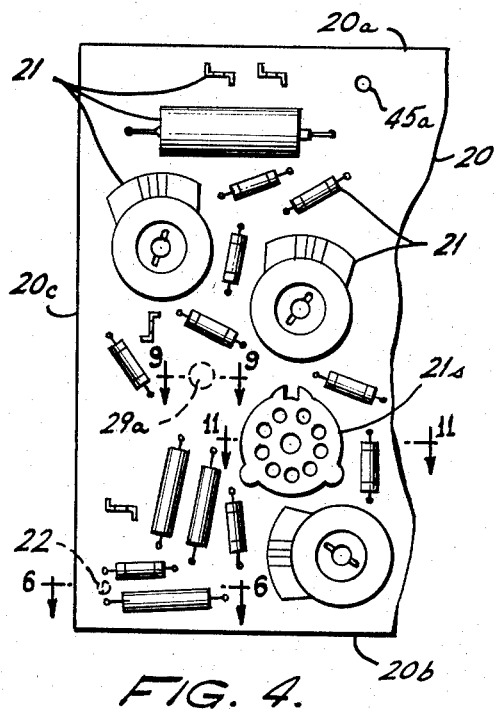
Figures 4 and 5 show, respectively, the top and bottom of one fragment of a panel.
Figure 11:
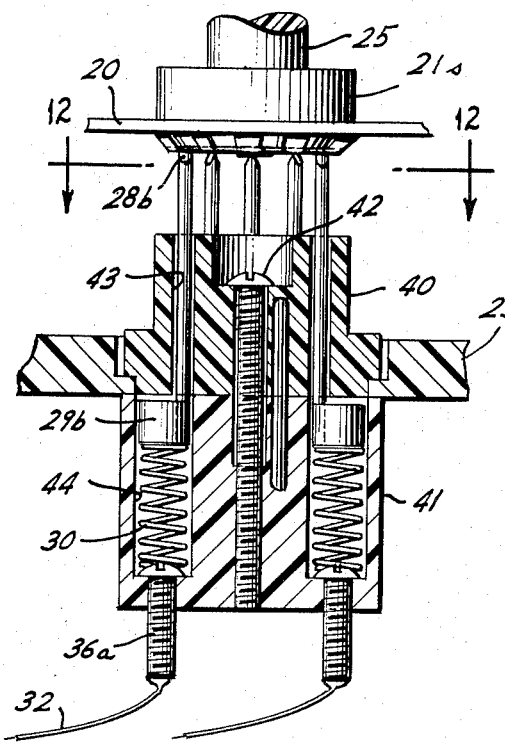
Figure 12:
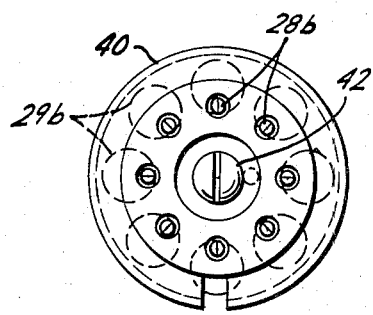
Figure 13:
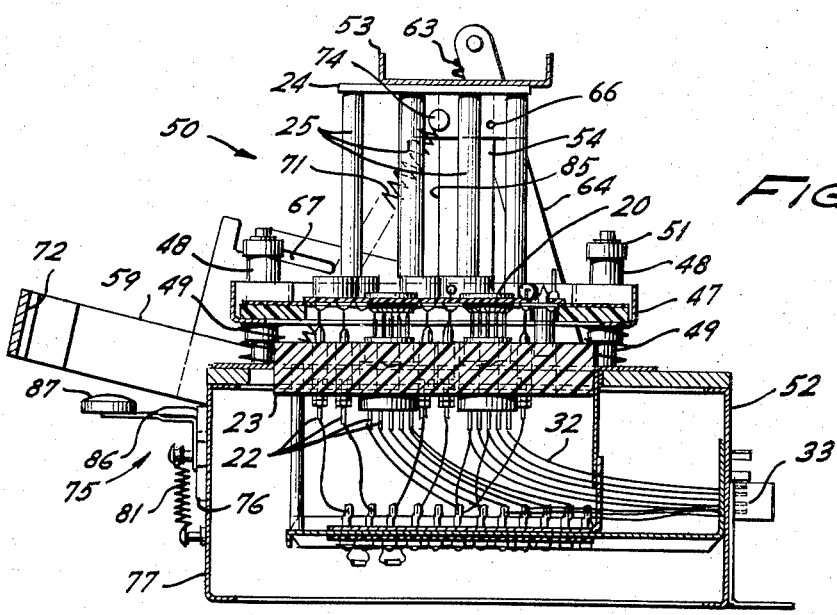

Figures 11 and 12 are, respectively, a similar section of still another detail taken along line 11—11 in Figure 4, and a view thereof taken along line 12—12 in Figure 11; and Figure 13 is a side view of the testing device, in partly closed position, certain parts of the device being broken away to show portions of the interior.

Figure 1:
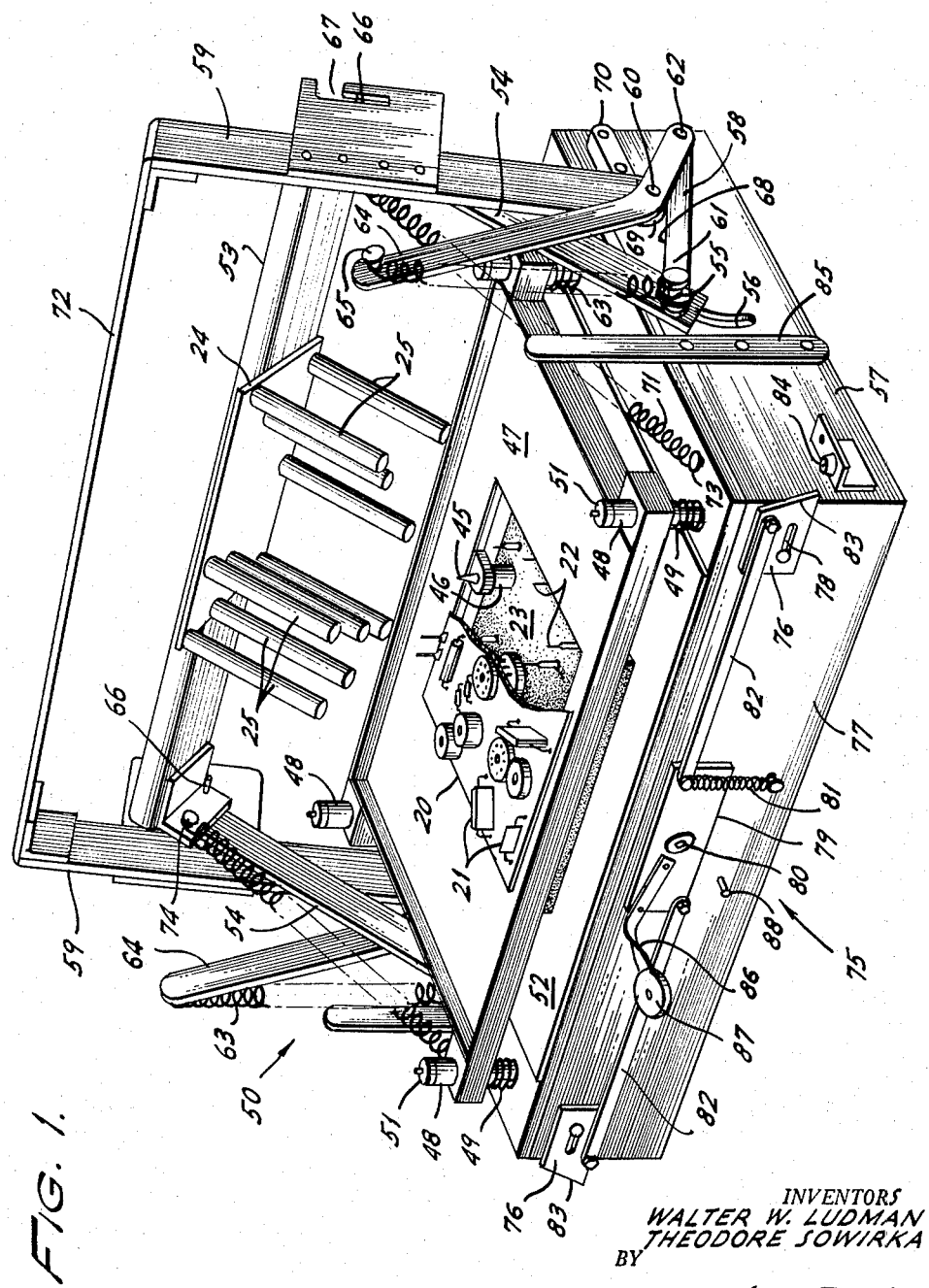

As shown in Figure 1, the eelctrical circuit panel 20 to be tested, with circuit components 21 installed thereon, rests on a system of contacting members 22, installed in and upwardly projecting from a plate 23; and there is provided an overlying back-up plate 24 with a system of back-up fingers 25 projecting from the underside thereof.

Figure 2:
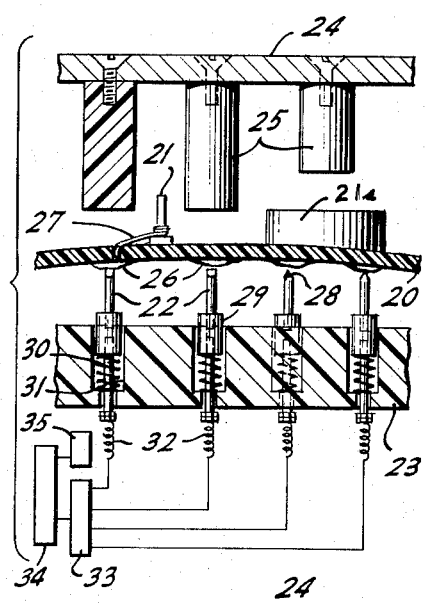
Figures 2 and 3 are diagrams illustrative of a panel testing operation; basic parts of the testing device being shown in the two figures, respectively, in open and closed position.

As diagrammatically shown in Figure 2, solder spots 26 on the underside of the panel 20 may be connected with the components 21 by conductors 27; and contacting members 22 support the panel by contact between such solder spots and sharpened upper chisel points 28 of the contactors. Each contactor has the form of a pin, with such a chisel point at the top, with a plug 29 coaxially secured to the pin between the ends thereof, and with a spring 30 installed in a recess 31 of the plug holder plate 23 and urging the plug 29 and pin 28 upwardly. However, for reasons including irregular profiles of solder spots 26, only some of these spots may be actually contacted by the associated chisel points 28, in the open position of the device; others may be spaced above the corresponding points, at least by slight differences, such as a few thousandths of an inch.

Figure 3:
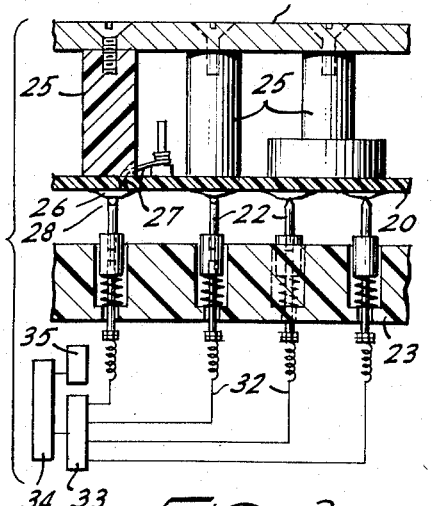

When the device is closed, as diagrammatically shown in Figure 3, the back-up system 24, 25 rigidly presses downwardly on the panel 20. All solder spots 26 to be tested are then in contact with the sharp points 28 of the corresponding test pins 22, and each test pin is resiliently urged against the panel and the back-up system by its spring 30, a rigid support being provided by the plate 23.

In this latter position of the machine as illustrated, the test plugs are lowered, and their springs compressed, by a distance which desirably equals at least several times the maximum difference in level or plane between the contact spots, for instance the pins may be lowered through an average distance of about one inch, with a possible variation of about one-eighth of an inch plus or minus. This insures positive loading of each contactor spring 30 and minimizes differences between such loadings of different springs.

Each contactor spring may then apply a very positive upward force, for instance about eight ounces, to the associated plug; and as the area of contact between each chisel point 28 and solder spot 26 is small enough, there can be obtained a high unit pressure, for instance of the order of about fifteen to twenty tons per square inch. The total force to be overcome by the operator or operating device, in closing the machine, depends on the number of test plugs used; for instance, if there are a hundred such plugs, the total static pressure absorbed by the back-up system, at the end of the one inch compression of the springs, may be about fifty pounds. These figures are mentioned only as examples, typical for one possible application of the invention; they are not critical for the invention in its broader aspects.

Figure 5:
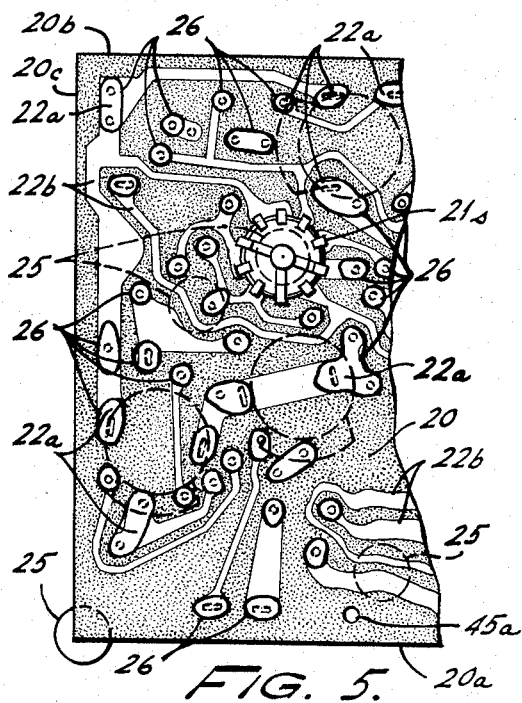

Referring now to Figures 4 and 5, it will be noted that the solder spots 26 and their more or less central areas contacted by the test plugs 22—some of which are indicated as 22a—are distributed over the panel area in a manner somewhat similar to, although not identical with, the distribution of components 21 between the front and back edges 20a, 20b and the side edges 20c of the panel. The positioning of the solder spots 26 and contact areas 22a is dependent not only on the placement of the components and of their lead wires 27, but also on the required layout of the associated circuit elements 22b which constitute the printed circuitry of the panel. Ordinarily each component 21, on top of the panel, has one or several conductors 27, passing from the upper side of the panel through a suitable insertion hole to the underside, where it is connected by one of the solder spots 26 with a printed circuit element 22b, the latter usually leading to other solder spots, lead wires and components. It may be noted that, in order to suitably locate the contacting members 22, the contacted panel areas 22a of different circuit elements 22b may either coincide with or be spaced from the points where the corresponding conductors 27 pass through the panel.

A somewhat similar plan of distribution over the panel area may be employed for the back-up fingers 25, as illustrated in Figure 5. It is possible and often desirable to employ a relatively few back-up fingers, as shown, in contrast to the relatively numerous contacting members 22. With greater particularity, the placement and distribution of the back-up fingers 25 is dependent mainly upon the physical dimensions and characteristics of the components 21 on top of the panel, while the arrangement of the contacting members 22, as mentioned, depends on the layout of the printed circuitry on the underside of the panel.

It is, of course, undesirable to apply substantial back-up pressures to delicate elements such as vacuum tubes, thin ceramic wafers and the like, whereas back-up pressure can readily be applied to other components, such as tube sockets wherein the tubes have not been inserted as yet. This latter expedient is sometimes desirable since eight or more contactors, arranged in an annular or generally regular pattern, usually are provided on the underside of such a socket; the backing up of such a pattern can be simplified by using a single back-up finger for all of these contacts, coaxially with the ring or other pattern which is formed by them. A back-up finger arranged in this manner is shown in Figures 2 and 3, at the right. Since they are to be placed on the tube sockets, not on top of the panel direct, such fingers are made suitably shorter than the other back-up fingers 25, shown at left and in the middle.

The system of back-up fingers is so arranged that, as shown in Figure 3, the panel 20 is held in a flat and undistorted plane when the testing device has been closed and when accordingly the resilient pressure of the plugs 22 has been applied to the panel backed up by the fingers.

Actual straightening of each panel under test, or at least of most of the panels under test, is frequently provided by this arrangement, it being very common that the panels 20 in their free condition, are warped to a fairly substantial extent, as best shown in Figure 2. Such warping may be caused by inherent characteristics of the materials and procedures employed, particularly by the depositon of metallic circuitry 22b on one surface of a resilient, insulating panel made of synthetic resinous material and the like. This warping, which usually is convex to the metal side of the panel, is of no significance for the use and service of most electronic devices, but presents a testing problem since it adds to the aforementioned irregularity of spacing between solder spots and test plugs, in the open position of the testing device.

The present invention insures the desired establishment of substantially uniform, positive contact pressures for the different contactors, although this is complicated by said irregularities of spacing. In this connection it is important that the fingers 25 provide a flat, planar arrangement of each panel under test, no matter how warped the panel may be in free condition. In some cases, where the panels are relatively large or where differences in degree of warping are relatively pronounced, this flat, planar positioning of the panel may even be required, additionally, in order to avoid lateral misorientation of contacting areas 22a; this may be important mainly where such contact areas must be made very small and must be located in close proximity to one another.

In order to receive and transmit suitable electrical testing impulses, each test plug 22 has a conductor 32 flexibly secured to the lower end thereof, below the holder plate 23, as shown in Figure 3; and these various conductors may lead to a circuit unit 33 connected to an electrical testing device 34 adapted to compare characteristics of the connected panel 20 with the characteristics of a preselected master panel 35, by means such as stepping and testing circuits, known to the art and not shown in detail herein.

Figure 6:
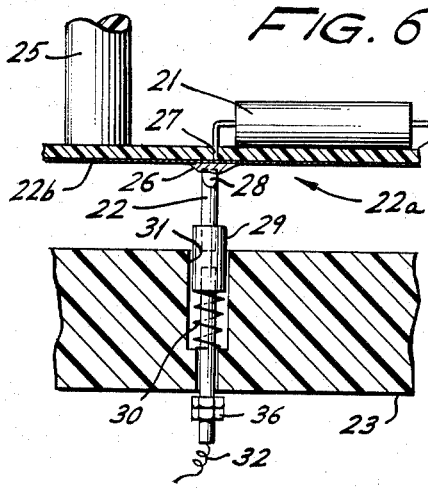
Figure 6 is an enlarged, sectional detail view taken along line 6—6 of Figure 4.
Figure 7:
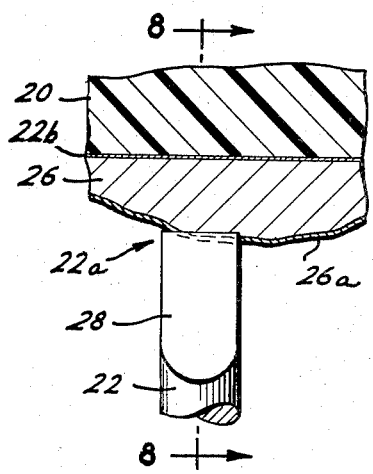
Figure 7 is a more enlarged detail from Figure 6.
Figure 8:
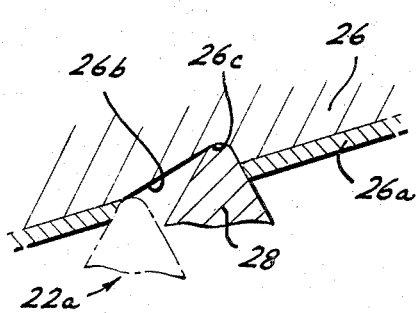
Figure 8 is a still more enlarged sectional view of a fragment of the detail of Figure 7 taken along line 8—8 in that figure.

One of the panel contact areas 22a provided by a solder spot 26 is shown in greater detail in Figures 6 to 8, whereas Figures 9 to 12 show details of modified contacting means. Any or all of these types of contactors may be provided with stop means 36, such as a nut and lock nut threaded on the lower end of the pin 22, in order to prevent overexpansion of the spring 30 and loss of the test plug when the device is opened.

As shown in Figures 7 and 8, there may often be at least a thin layer 26a of dust or oil or the like, which may cover and may to some extent insulate one or both of the surfaces 28 and 22a to be brought into contact with one another for testing purposes. It is the purpose of the substantial contact pressure mentioned above, such as 15 to 20 tons per square inch, to break such a film and thereby to establish sound electrical contact. An actual indentation 26b is formed in the relatively soft and thick solder metal 26 by the relatively hard and sharp chisel member 28. As this member penetrates through the insulating film 26a and into the solder metal 26, it compresses the latter with a wedge action; and due to the irregularity of form of the solder spot, some lateral deflection of the chisel "point" is inherent in this action. This leads to a scraping of said "point" along the surface of the indentation. All this then causes thinning and at least local rupturing of the insulating film, thereby safely establishing an area 26c of metal-to-metal contact in at least a part of the indented area 26b.

Figure 9:
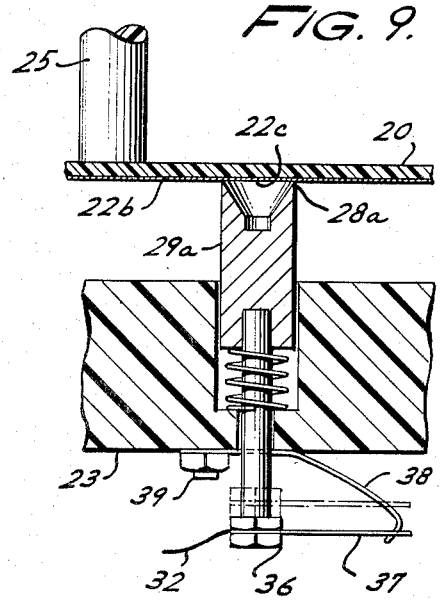
Figures 9 and 10 are, respectively, a section similar to Figure 6 and a bottom view thereof, showing a modified detail, the section being taken along line 9—9 in Figure 4.
Figure 10:
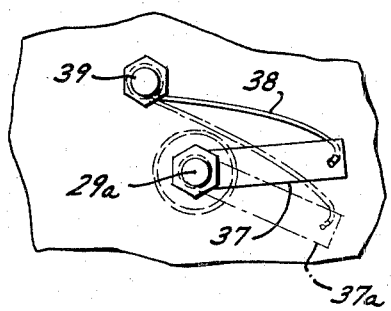

At certain positions, where a printed circuit element 22b, not a solder spot must be contacted, it will often be preferred to use a modified plug 29a, shown in Figures 9 and 10, which may contact an area 22c of element 22b by a sharp but annular and relatively elongated edge 28a, for establishing metal-to-metal contact without actually penetrating into the contacted metal to any substantial extent. This is usually preferable in the direct contacting of parts such as printed wiring strips 22b, which might otherwise be separated from the panel surface. It is preferred in this case to provide a horizontal wiping motion of the annular edge 28a. For this purpose the lower part of the plug member 29a may have an arm 37 fastened thereto which extends radially to the axis of the plug; and a curved, resilient wire 38, anchored to the underside of the holder plate 23 by a fastener 39, may be arranged so that vertical motion of the plug 29a and arm 37 also causes horizontal rotary motion of said arm, of the plug and of its contact edge, about the axis of the plug, between positions 37 and 37a. This rotation and the resultant wiping action of the breaking of a thin insulating layer, takes place not only while the edge 28a moves through said layer, but also while the contactor springs are being depressed, as has been described.

In some cases, for instance in the individual testing of tube socket terminals 21s or the like (Figs. 4, 5), testing points may be very close to one another as to lateral spacing in one group, and/or substantially spaced apart from other groups as to level or vertical elevation. In some cases a cluster of test plugs, desirably having thin, pointed pins 28b (Figures 11 and 12) may be combined in a special holder, for instance in a separate test plug socket 40, which may be removably secured to the holder plate 23 by a block 41 with the help of a central fastening bolt 42.

More particularly described, the members 40, 41 may have aligned recesses 43, 44 for each test plug 28b; the lower recesses 44 being relatively wide and arranged in a relatively wide circle, so as to receive relatively large, laterally projecting plug members 29b (Fig. 12) and to stop excessive upward motion thereof, thereby dispensing with stop nuts 36. A spring 30 can be mounted in each recess 44 in order to provide the required resiliency of the plug; and such a spring may also serve as a conductor between the plug and the associated terminal 36a of lead wire 32. Because of the concentrated forces applied to the panel by the spring-loaded plugs 28b, a back-up finger 25 is desirably associated with each socket or the like, to be tested by such plugs.

While the construction and operation of each individual test plug 28b, in a socket 40, can be the same as that of an individual plug 28 or 28a in the holder plate 23, the construction of the entire testing tool assembly frequently becomes both cheaper and faster by the expedient of using pre-assembled, interchangeable test plug sockets 40, each containing a plurality of testing elements. Therefore it may be desirable to use sockets of this type even in cases where the lateral spacing between contact areas is wide, or at random, and where their vertical spacing is only slight.

Still other modifications of the test plug means are possible; it is, however, desirable that any modified plugs, as well as those described, should allow suitable cooperation with the back-up system 25. In order to fully explain this cooperation, reference will now be made, once more, to Figure 1, the general arrangement of which has been considered above.

The apparatus as shown in this figure has two or more dowel means 45 for holding and registering each panel 20 to be tested; and matching dowel holes 45a are provided in each panel 20 (Figure 4). The dowel members 45 (Figure 1) may have the form of upwardly tapering pins, upwardly loaded by spring means, not shown, which may be installed in holder units 46 connected with the plate 23 by a desirably insulating, overlying frame member 47.

The outer part of this frame also provides guide means 48 whereby panel 20, together with dowels 45 and frame 47, can be guided in vertical directions, in response to the downward pressure of the back-up system. Upwardly biasing frame springs 49 are associated with the guide means 48, for compression and expansion together with the test plug springs 30, and for the purpose of assisting in the operation of the mechanism 50 which serves to open and close the testing device. Adjustment means 51 may be used to raise or lower the frame relative to the frame springs and thereby to select a suitable, effective contact pressure, applied by the test plug springs 30 when the device is closed. The frame springs bear against a box-like understructure 52, to which the test plug plate 23 is rigidly but removably secured. The back-up plate 24 is movably connected with this understructure by the mechanism 50, and the frame 47 is vertically slidably connected therewith by the guides 48.

Figure 1 shows the mechanism 50 in the condition which is referred to as "open," wherein the frame 47 is exposed and accessible for insertion of a panel 20 to be tested and wherein even after the insertion of the panel, the circuits 32 of at least most of the test plugs (Figure 2) are interrupted and open at 28. By contrast, the lowered position of Figure 3 is referred to as "closed"; and a position intermediate between these open and closed positions is shown in Figure 13.

As clearly shown in the latter figure, the back-up plate 24 is mounted on a narrow, rigid channel member 53, extending above the understructure 52. In the present embodiment the ends of channel member 53 are rigidly secured to a pair of links 54, the lower ends of which, as shown in Figure 1, have pins 55 attached thereto, said pins being adapted to slide in arcuate slots 56, formed in side members 57 of the understructure 52. Lower and upper ends of each link 54 are guided respectively by levers 58 and 59; each lever 59 is also serving as an arm for manual actuation of the device. For this purpose each arm 59 is pivoted to the side member 57 by a pin 60. Each lever 58 has a movable front end 61 and a rear end pivoted to side 57 by a pin 62; and each front end 61 is urged upwardly by a spring 63, anchored on a bracket 64 which may be rigidly secured to the side 57 for instance by pins 60, 62. Each spring 63 is connected to sliding pin 55 at lever end 61 and to a pin 65 at one end of bracket 64. Thus the lever 58 and links 54 are resiliently urged in an upward direction.

The back-up system 24, 25 is forced to move upwardly, with the links 54, but in a direction having a backward component by virtue of the pivoting of the levers 59; those levers being connectable with the channel 53 by pin and slot means 66, 67. Further, the resilient upward urging of each lever 58 presses a sliding or rolling cam surface 68 of this lever against a suitably shaped lower end surface 69 of the associated lever 59, so as to yieldably counteract the start of a closing movement of the entire linkage for the back-up system, thereby tending to hold the system open—so far as allowed by a stop 70—against the action of closing springs 71.

This hold-open action ceases when the cam pressure at 68, 69 has been overcome by manual or mechanical force, in a closing movement of the system 54, 59, which movement may be effected by means of a bar 72 interconnecting the top ends of levers 59. Incidentally, during this closing movement the pins 66, secured to the channel 53, lose their engagement with the slots 67 in the levers 59. The closing springs 71 tend to aid or complete the closing movement, their lower ends 73 being anchored to the sides 57 of the understructure 52 and their upper ends 74 being secured to the ends of the channel member 53. However, further resistance to complete closure of the machine is given by the frame springs 49. Therefore, a mere forward pulling of bar 72 establishes merely the partly closed position of Figure 13. This position substantially coincides with the start of the contact-enforcing actions, which have been described in connection with Figure 8 or 10.

Those actions can then be performed and completed, by depression of bar 72, which now, in the position of Figure 13, may press directly on the pins 55 (Figure 1). The machine can then be held closed for a suitable time, by a mechanism 75.

This latter mechanism, as shown in Figure 1, may comprise: a pair of small plates 76, horizontally slidable along a front member 77 of the understructure 52 by a pin and slot arrangement 78; a plate 79, adapted to rock about a pivot 80 under the force of a spring 81; and links 82, interconnecting plates 79 and 76. The latter plates have beveled side edges 83, which cooperate with the downwardly moving arms 59 to cause inward sliding of these plates 76; and when the arms 59 override these edges 83, the plates 76 return outwardly. The arms now also hit resilient bumpers 84, secured to the side members 57, thereby locking the apparatus in closed condition.

In, as well as adjacent to, this closed position, as shown in Figure 13, the back-up plate supporting links 54 stand substantially vertically, being pulled forward by the closing springs 71 and being held by vertical stop members 85.

For the purpose of subsequently opening the device, the rocking plate 79 (Figure 1) is provided with a crank arm 86 having a hangle 87 whereby the arm can rotate the plate in counterclockwise direction until the plate hits a stop 88. In this way the latch plates 76 are retracted and the arms 59 set free to resiliently return to their raised and opened positions. The resilient returning or opening force is provided by the plug and frame springs 30 (Figure 2) and 49 (Figure 1), which in the previous closing of the device, as mentioned above, were compressed. The combined force of these springs now urges the back-up system 24, 25, 53, 54, 59, etc., upwardly into the open position, against the relatively feeble resistance of the closing springs 71. For rapid operation, and also for establishment of adequate electrical contact as described, the resilient upward force is desirably made quite substantial; therefore, as soon as the unlatching key 87 is depressed, the back-up system is thrown into open position, with a snap action. The system is prevented from bouncing back from the back stop 70, by the aforementioned cam action of the members 68, 69.

It will thus be seen that the specific mechanism illustrated comprises means 72 for closing the device; means 87 for opening it; means 76 for holding it closed; means 68, 69 for holding it open; and linkage 54, 58, 59, cooperating with slot and guide means 56, 85, etc. for guiding the closing movement and establishing the proper closed position for vertical back-up pressure.

In the operation of the testing device as illustrated, the operator sits or stands opposite the front portion 77 (Figure 1). A suitable conveyor, not shown, supplies panels 20, with components 21 mounted and soldered thereon, for testing. By manual operation or by suitable automatic means, not shown, each successive panel 20 is brought over and onto the dowels 45, while the device is open (Figure 2). Thereupon the yoke 72 is depressed, by manual operation or by suitable automatic means, not shown, establishing the closed position (Figure 3). In this position the electrical testing system 34 is started, for instance by a suitable switch, not shown; it now sends suitable rapid testing pulses through the conductors 32, contactors 22 and panel elements 22a, 26, 26b, 21, etc., for automatically comparing their electrical characteristics, in known manner, with those of predetermined elements in the master unit 35. Desirably the unit 34 indicates or records, in suitable numbers or symbols, such components or circuit elements as are found "below standard" in this testing.

After this testing and indicating or recording, which may for instance occupy a few seconds for all of the components of a panel, the unlatching key 87 is depressed; thereupon the back-up system 54, 24, 25 springs open and the tested panel 20 is then removed from the dowels 45. In case that one or more of the circuit elements were found to be below standard, the panel is marked accordingly, while it may otherwise be conveyed further on, to a point where the system of solder spots and conductors may be varnished and other finishing operations performed.

The above-described operations can be performed on panels with or without components mounted thereon, for testing the characteristics or parameters of components, solder joints, spring joints, printed conductors, etc. Substantially the same operations can also be performed on panels providing mounting arrangements or circuitry or both on more than one side; and in fact, similar procedures can be used, in accordance herewith, on component carriers other than flat or slightly warped panels. In all cases the operation is greatly facilitated and made very accurate, universal, safe and positive, as explained above.

While only a single embodiment of the machine and three types of test plugs have been described, it should be understood that the details thereof are not to be construed as limitative of the invention, except insofar as set forth in the following claims.

We claim:

1. In apparatus for electrically testing resilient circuit panels, said panels having circuit components thereon and having component lead conductors exposed on and distributed over panel surfaces opposite the components: a base adapted for temporary engagement with and rapid disengagement from such a panel; a plurality of contact members, distributed over and extending from a surface of said base, each for contacting one of said conductors of a panel on said base; and a rigid backup structure, movably connected and indexed with the base to allow said engagement and disengagement of panels on the base; said backup structure comprising a holder and a plurality of spaced backup fingers, extending from the holder, for contact with a plurality of areas distributed over each of the resilient circuit panels, opposite said conductors.

2. In apparatus as described in claim 1, the feature that some of said backup fingers extend from said holder a distance sufficient for them to contact panel areas directly and that other backup fingers extend from said holder over shorter distances, sufficient for them to contact only certain of said components.

3. In apparatus for electrically testing circuit panels of resilient material, tending toward irregular warpage, said panels having circuit components thereon and having metallic component terminals exposed on and distributed over panel surfaces opposite the components: a base for temporarily supporting and registering such a panel and for rapid disengagement thereof; a plurality of contact elements, distributed over, extending from and resiliently connected with a surface on said base, for contacting said component terminals of a panel so supported and registered; and a rigid backup structure, movably connected with the base to allow insertion and removal of panels on the base and to temporarily hold a panel, reacting against the contact elements, at predetermined distance from the base regardless of the resilience of the panel and contact elements, said backup structure comprising a plurality of backup elements spaced from one another for contact with panel areas interspersed with said components.

4. In apparatus as described in claim 3, for testing panels whereon groups of component terminals are arranged, each group having close, annular arrangement, the feature that contact elements for contacting such terminals are similarly arranged in groups, and that an individual means for establishing resilient pressure is associated with each of said contact elements of a group.

5. In apparatus as described in claim 3, a support structure; a frame installed above the base for holding panels to be tested, registered with the contact elements; a mechanism connected with the support structure and adapted resiliently to depress the frame, with a panel thereon, against the contact elements; and a support means for the rigid backup structure, movably connected with the support structure for holding the panels against the conductor plugs.

6. Apparatus as described in claim 5, wherein said backup structure is adapted to apply substantially distributed pressure to each panel, regardless of surface irregularities of the panels.

7. Apparatus as described in claim 5, comprising means for moving the backup structure into a position where it establishes contact with a panel and to depress the panel and the testing contactor plugs; means for locking the backup structure in such position; and means for unlocking the backup means and removing it from such position.

References Cited in the file of this patent

UNITED STATES PATENTS

| | | |
|---|---|---|
| 1,519,499 | Menefee | Dec. 16, 1924 |
| 1,928,157 | Levin | Sept. 26, 1933 |
| 1,961,578 | Bowers | June 5, 1934 |
| 2,158,630 | Lloyd | May 16, 1939 |
| 2,286,812 | Keefe | June 16, 1942 |
| 2,399,753 | McLarn | May 7, 1946 |